US009612641B2

(12) United States Patent
Bartley et al.

(10) Patent No.: US 9,612,641 B2
(45) Date of Patent: Apr. 4, 2017

(54) ADJUSTING THE CONNECTION IDLE TIMEOUT IN CONNECTION POOLS

(75) Inventors: Timothy Simon Bartley, Worongary (AU); Scott Anthony Exton, Ormeau Hills (AU)

(73) Assignee: International Business Machines Corporation, Armonk, NY (US)

( * ) Notice: Subject to any disclaimer, the term of this patent is extended or adjusted under 35 U.S.C. 154(b) by 1475 days.

(21) Appl. No.: 12/948,547

(22) Filed: Nov. 17, 2010

(65) Prior Publication Data

US 2012/0124217 A1     May 17, 2012

(51) Int. Cl.
*H04L 12/26*     (2006.01)
*G06F 1/32*     (2006.01)
*H04L 12/917*     (2013.01)
*H04L 12/28*     (2006.01)

(52) U.S. Cl.
CPC ........ *G06F 1/3209* (2013.01); *H04L 12/2863* (2013.01); *H04L 47/76* (2013.01); *H04L 43/08* (2013.01); *H04L 43/0811* (2013.01)

(58) Field of Classification Search
CPC ... G06F 1/3209; H04L 12/2863; H04L 47/76; H04L 43/08; H04L 43/0811
USPC .................................................. 709/223, 203
See application file for complete search history.

(56) References Cited

U.S. PATENT DOCUMENTS

| 6,105,067 | A * | 8/2000 | Batra ............................ 709/227 |
| 7,287,082 | B1 | 10/2007 | O'Toole, Jr. ................. 709/228 |
| 7,289,804 | B2 * | 10/2007 | Kim ............................ 455/432.1 |
| 8,094,554 | B2 * | 1/2012 | Gholmieh et al. ............ 370/230 |
| 2004/0160910 | A1 * | 8/2004 | Gorsuch et al. .............. 370/328 |
| 2004/0196182 | A1 * | 10/2004 | Unnold ..................... 342/357.07 |
| 2005/0120117 | A1 | 6/2005 | Burckart et al. ............. 709/227 |
| 2006/0146877 | A1 | 7/2006 | Srivastava .................... 370/469 |
| 2007/0266320 | A1 * | 11/2007 | Adams et al. ................ 715/700 |
| 2007/0268910 | A1 | 11/2007 | Shen et al. ............... 370/395.21 |
| 2008/0304850 | A1 * | 12/2008 | Groninger et al. ............ 399/88 |
| 2009/0066790 | A1 * | 3/2009 | Hammadou ................... 348/143 |
| 2009/0235037 | A1 * | 9/2009 | Mounier et al. ............. 711/161 |
| 2010/0042745 | A1 * | 2/2010 | Maeda et al. ................. 709/242 |
| 2010/0058455 | A1 | 3/2010 | Irudayaraj et al. ............ 726/11 |

OTHER PUBLICATIONS

"A Timer-Assisted Connection Pool Manager," IBM, IP.com, IPCOM000021752D, Feb. 5, 2004.

(Continued)

*Primary Examiner* — Alpus H Hsu
*Assistant Examiner* — Anthony Luo
(74) *Attorney, Agent, or Firm* — VanLeeuwen & VanLeeuwen; Richard A. Wilhelm (57) ABSTRACT

An approach is provided that responds to a connection request to connect to an external network entity using a connection from a managed connection pool. The connection pool is managed by selecting connections from the connection pool that includes one or more currently unused connections with the external network entity. One of the selected connections is validated by comparing an idle time associated with each of the selected connections to a maximum idle time value corresponding to the external network entity. The maximum idle time value being previously identified at the information handling system. The validated connection is then used to connect to the external network entity to satisfy the connection request.

24 Claims, 8 Drawing Sheets

(56) References Cited

OTHER PUBLICATIONS

"The Apache Tomcat Connector—Generic HowTo—Timeouts HowTo," Apache Software Foundation, 1999-2010.
"HowTo configure the C3PO connection pool," JBoss Community, Aug. 17, 2009.
"Performance Applications Pool Settings," .NET Framework Developer's Guide, Microsoft, 2010.
"Connection Pooling Configuration," Sun, retrieved Aug. 19, 2010 from http://java.sun.com/products/jndi/tutorial/ldap/connect/config.html.

\* cited by examiner

FIG. 8

ADJUSTING THE CONNECTION IDLE TIMEOUT IN CONNECTION POOLS

TECHNICAL FIELD

The present invention relates to managing network connection pools. In particular, the present invention relates to monitoring existing network connections and removing connections that have timed out.

BACKGROUND OF THE INVENTION

A connection pool is a cache of connections maintained so that the connections can be reused when future requests are received. Connection pools are used to enhance the performance of executing commands. Opening and maintaining more connections than are actually needed is costly and wastes resources. In connection pooling, after a connection is created, it is placed in the pool and it is used over again so that a new connection does not have to be established. If all the connections are being used, a new connection is made and is added to the pool. In addition, connection pooling generally reduces the amount of time a user or application must wait to establish a new connection.

SUMMARY

An approach is provided that responds to a connection request to connect to an external network entity using a connection from a managed connection pool. The connection pool is managed by selecting connections from the connection pool that includes one or more currently unused connections with the external network entity. One of the selected connections is validated by comparing an idle time associated with each of the selected connections to a maximum idle time value corresponding to the external network entity. The maximum idle time value being previously identified at the information handling system. The validated connection is then used to connect to the external network entity to satisfy the connection request.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
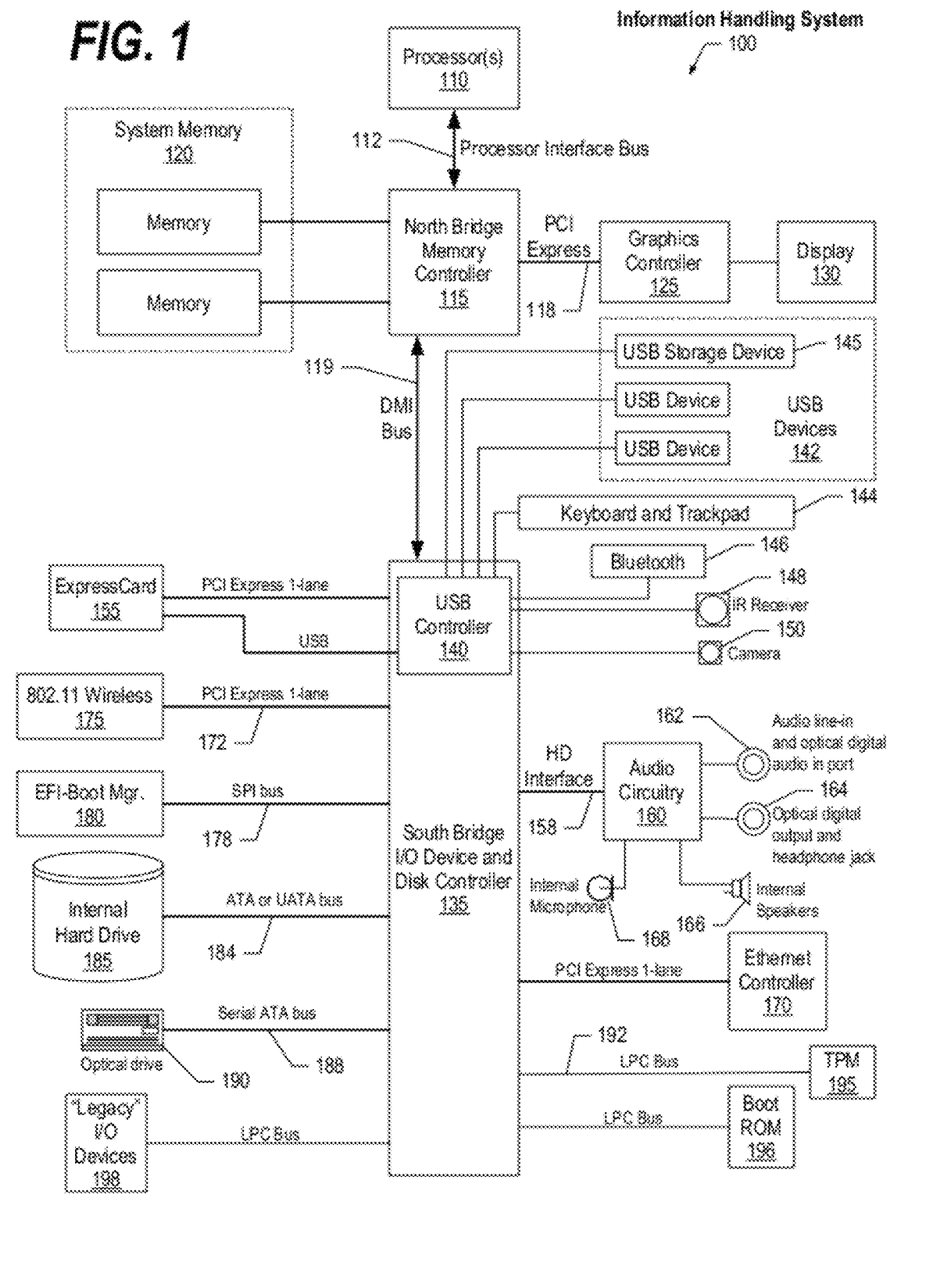
FIG. 1 is a block diagram of a data processing system in which the methods described herein can be implemented.
Figure 2:
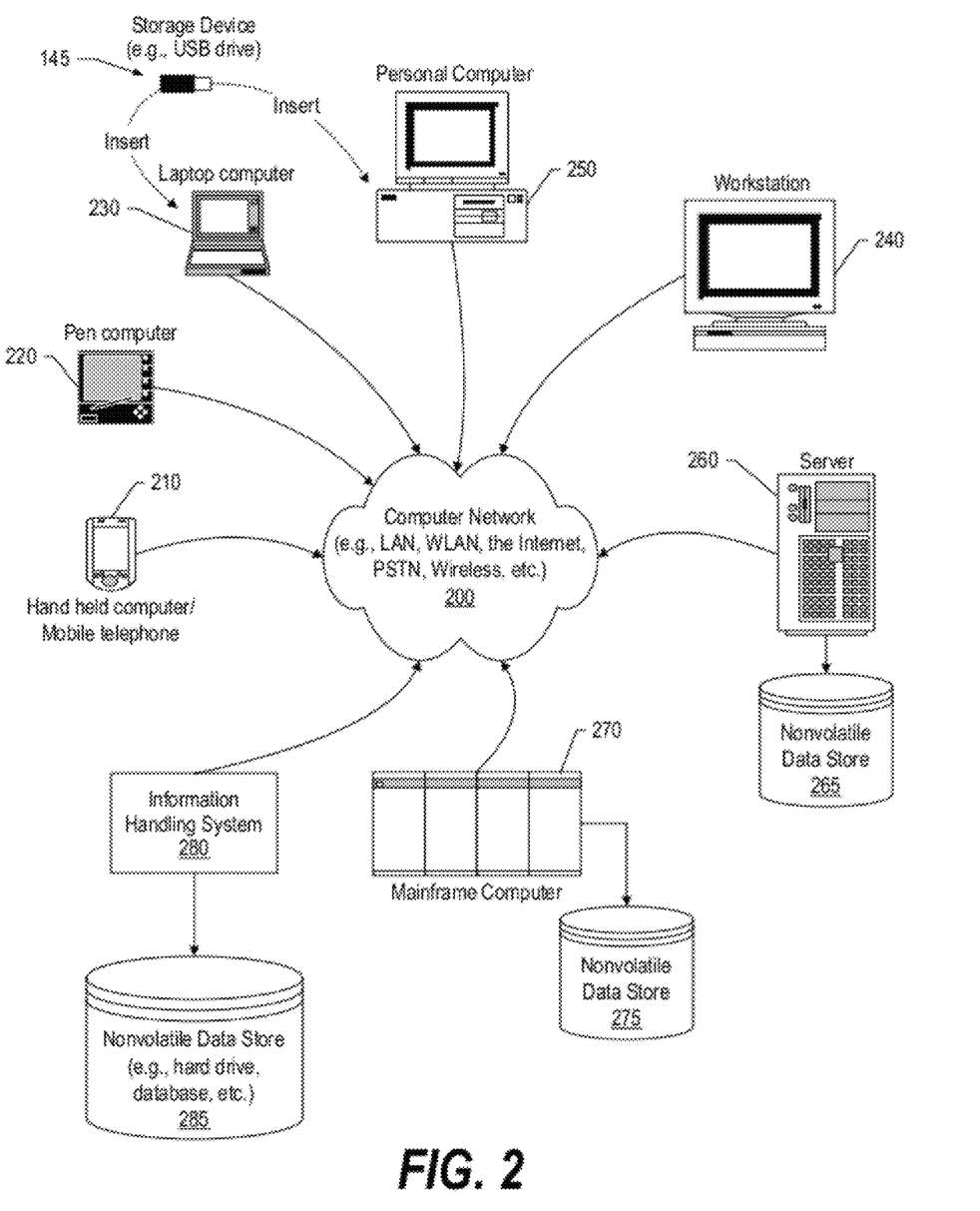
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
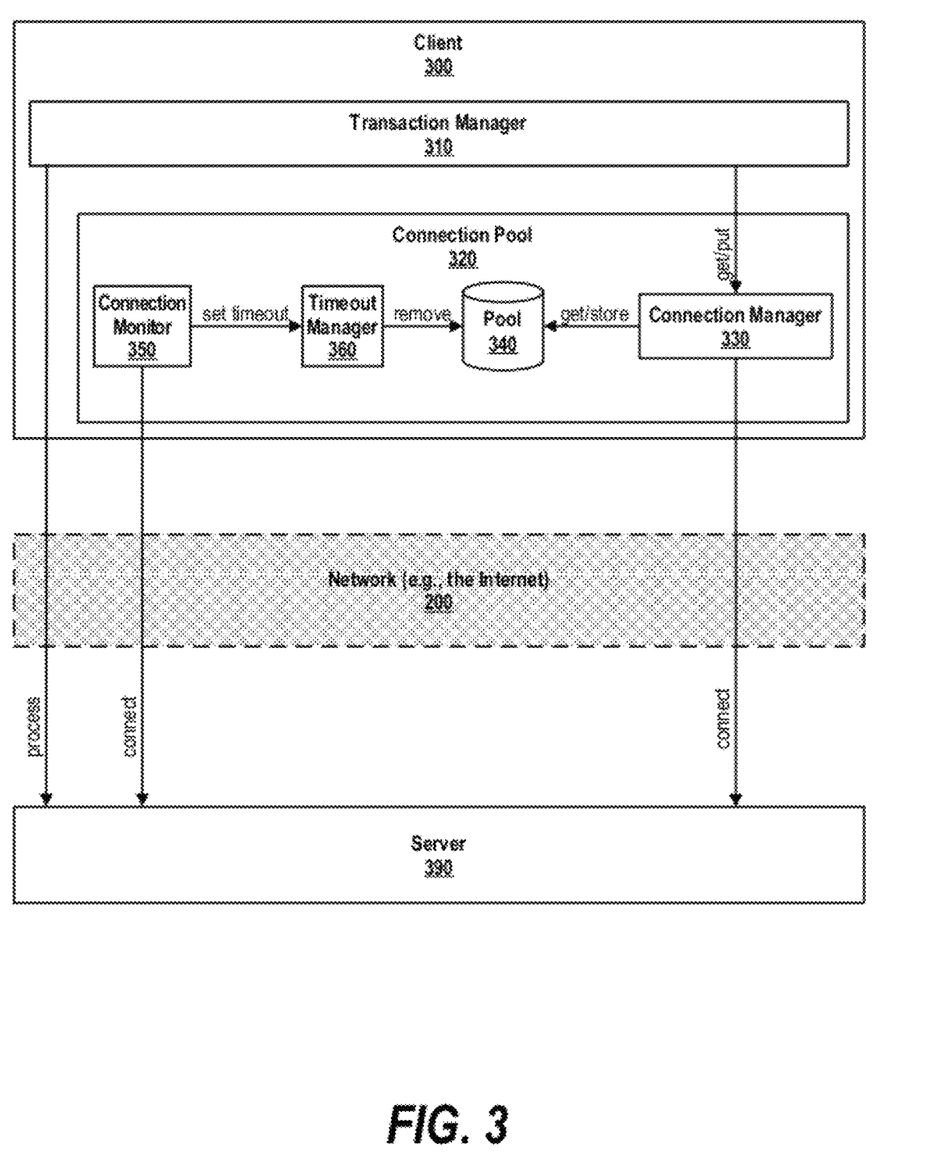
FIG. 3 is a diagram showing components used in improved connection pooling.

FIG. 3 is a diagram showing components used in improved connection pooling. Component entities include client computer system 300 and server computer system 390. Within client computer system 300 are transaction manager process 310 and connection pool process 320. Transaction manager 310 is responsible for client-side processing of transactions with server computer system 390. To facilitate transactions, connection pool manager 320 manages connection pool 340 so that transactions can utilize existing connections with server computer system 390 rather than needing to create new connections with server computer system 390.

Connection pool manager 320 includes connection manager 330 which is a process that receives connection requests from transaction manager 310 and receives connections that are still active from connection pool 340. In addition, when transaction manager 310 is finished with a connection, the connection is stored in connection pool 340 so that it can be used to satisfy a subsequent request. Connection pool manager 320 also includes connection monitor 350 which tests connections with server computer system 390 in order to ascertain the maximum idle time value that is being applied to open connections by the server. As shown in further detail below, connection monitor 350 continues to monitor connections in order to both ascertain the maximum idle time value as well as identify any changes to the maximum idle time value that might be made by the server. Connection pool manager 320 also includes timeout manager process 360 which is a process that monitors the available (currently unused) connections stored in connection pool 340. Timeout manager 360 uses the maximum idle time value identified by the connection monitor to remove connections from connection pool 340 when the idle time for the connection exceeds the maximum idle time value.

Figure 4:
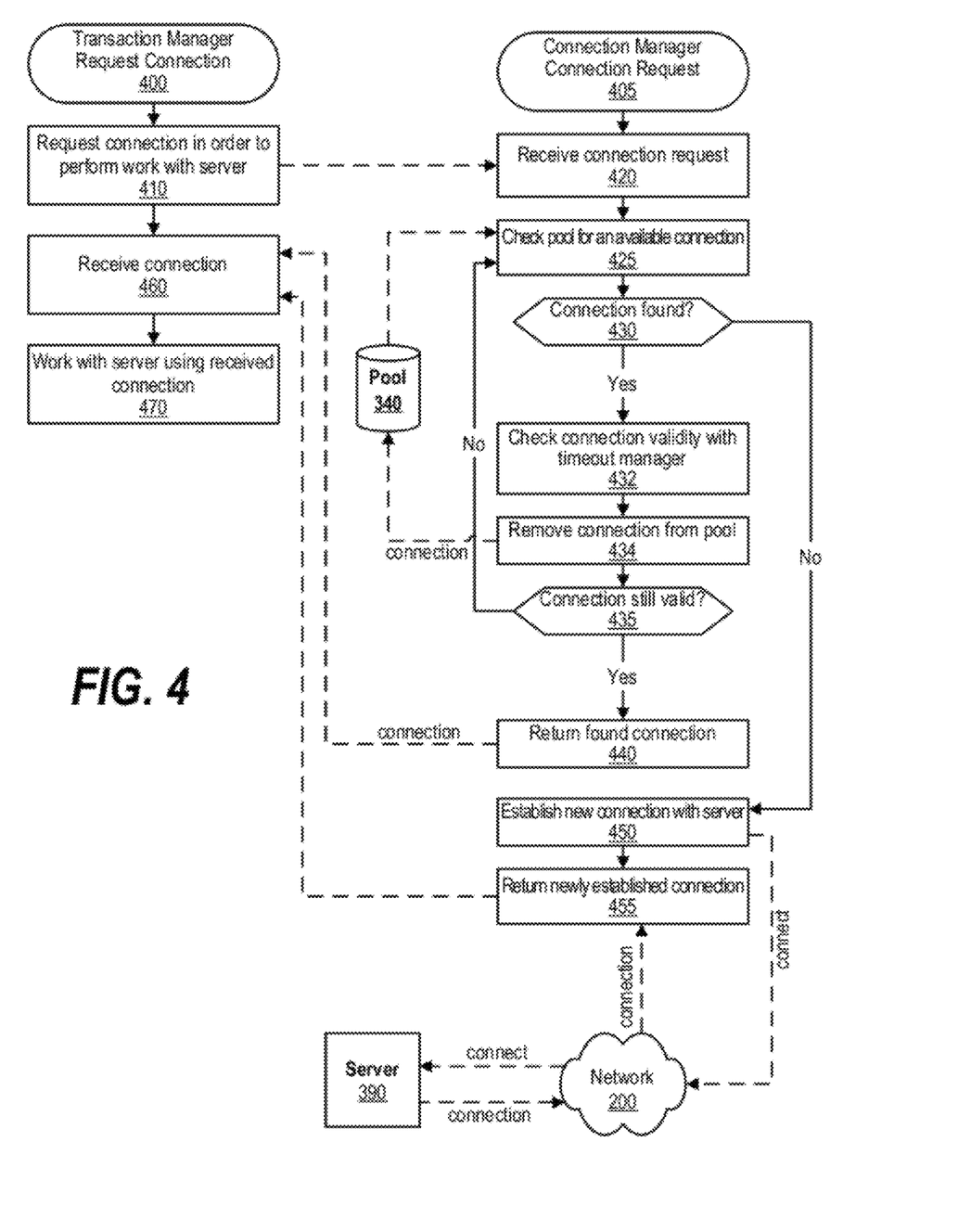
FIG. 4 are flowcharts showing steps taken by the transaction manager to request a connection and the connection manager to handle the connection request.

FIG. 4 are flowcharts showing steps taken by the transaction manager to request a connection and the connection manager to handle the connection request. Transaction manager processing is shown commencing at 400 whereupon, at step 410, the transaction manager requests a connection from the connection manager in order to perform work with the server.

Connection manager processing is shown commencing at 405 whereupon, at step 420, the connection manager receives the connection request from the transaction manager. At step 425, the connection manager checks connection pool 340 for an available connection with the server. A decision is made as to whether a connection with the server was found in the connection pool (decision 430). If a connection was found, then decision 430 branches to the "yes" branch whereupon, at step 432, the connection manager checks the selected connection's validity with the timeout manager. In one embodiment, step 432 is performed in order to identify a connection that is no longer valid but has not yet been removed from the connection pool by the timeout manager. At step 434, the selected connection is removed from connection pool 340 (as the connection is either no longer valid or will be returned to the transaction manager). A decision is made as to whether the selected connection is still valid (decision 435). If the connection is no longer valid (e.g., the connection has been idle for longer than the maximum idle time value), then decision 435 branches to the "no" branch to loop back to check the connection pool for another available connection and this looping continues until either a valid connection is found or until there are no more available connections in the connection pool. When, or if, a valid connection is found in the connection pool, then decision 435 branches to the "yes" branch whereupon, at step 440, the valid connection is returned to the transaction manager.

Returning to decision 430, if an available connection is not found in the connection pool, then decision 430 branches to the "no" branch bypassing steps 432 to 440. At step 450, a new connection is established with server computer system 390. The new connection is returned to the connection manager at step 455 and this newly created connection is returned to the transaction manager.

Returning to transaction manager processing, the transaction manager receives a connection from the connection manager at step 460. The connection that the transaction manager receives may be a connection retrieved from connection pool or a newly created connection established with the server. At step 470, the transaction manager works with the server (processes transactions, etc.) using the connection that was received from the connection manager.

Figure 5:
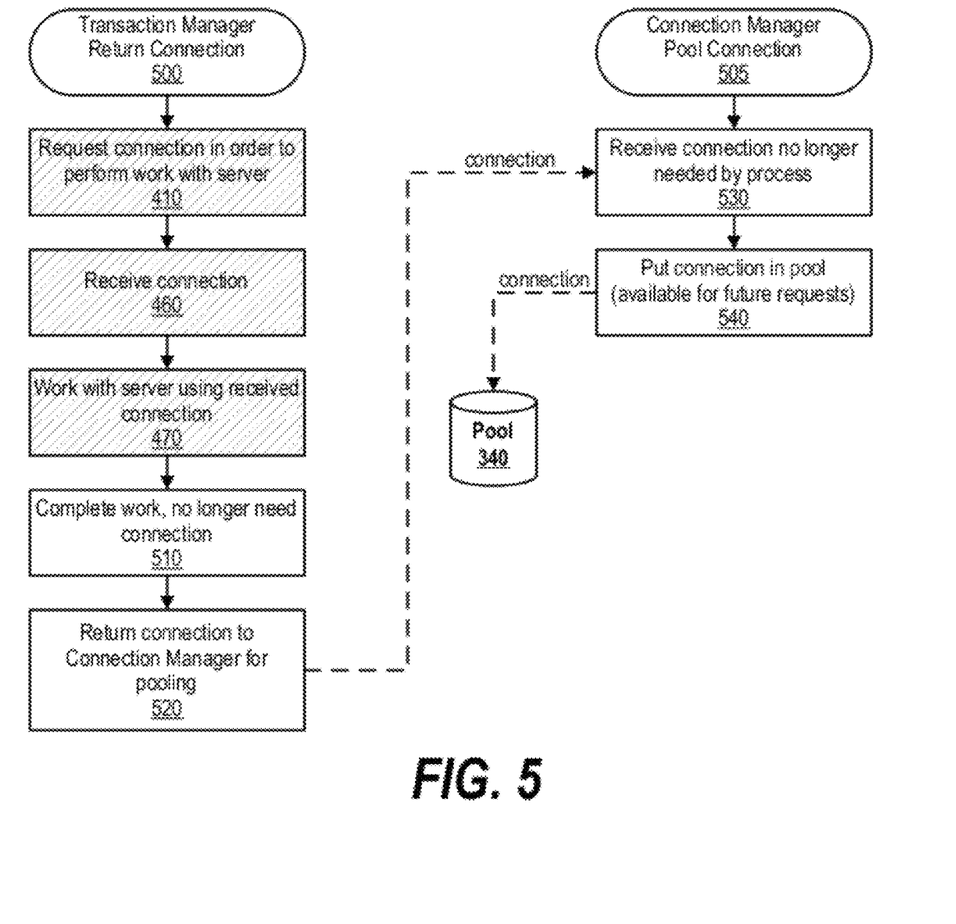
FIG. 5 is a flowchart showing steps taken by the transaction manager to return a connection and the connection manager to pool the connection.

FIG. 5 is a flowchart showing steps taken by the transaction manager to return a connection and the connection manager to pool the connection. Transaction manager processing is shown commencing at 500. At step 510, the transaction manager completes work with the server using the connection that was supplied by the connection manager and no longer needs the connection with the server. Consequently, at step 520, the transaction manager returns the connection back to the connection manager for pooling so that the connection might be used by another process that requests performance of one or more transactions with the server.

Connection manager processing is shown commencing at 505 whereupon, at step 530, the connection manager receives the connection from the transaction manager that is no longer needed. At step 540, the connection manager puts the unneeded connection in connection pool 340 so that it might be reused using the processing shown in FIG. 4.

Figure 6:
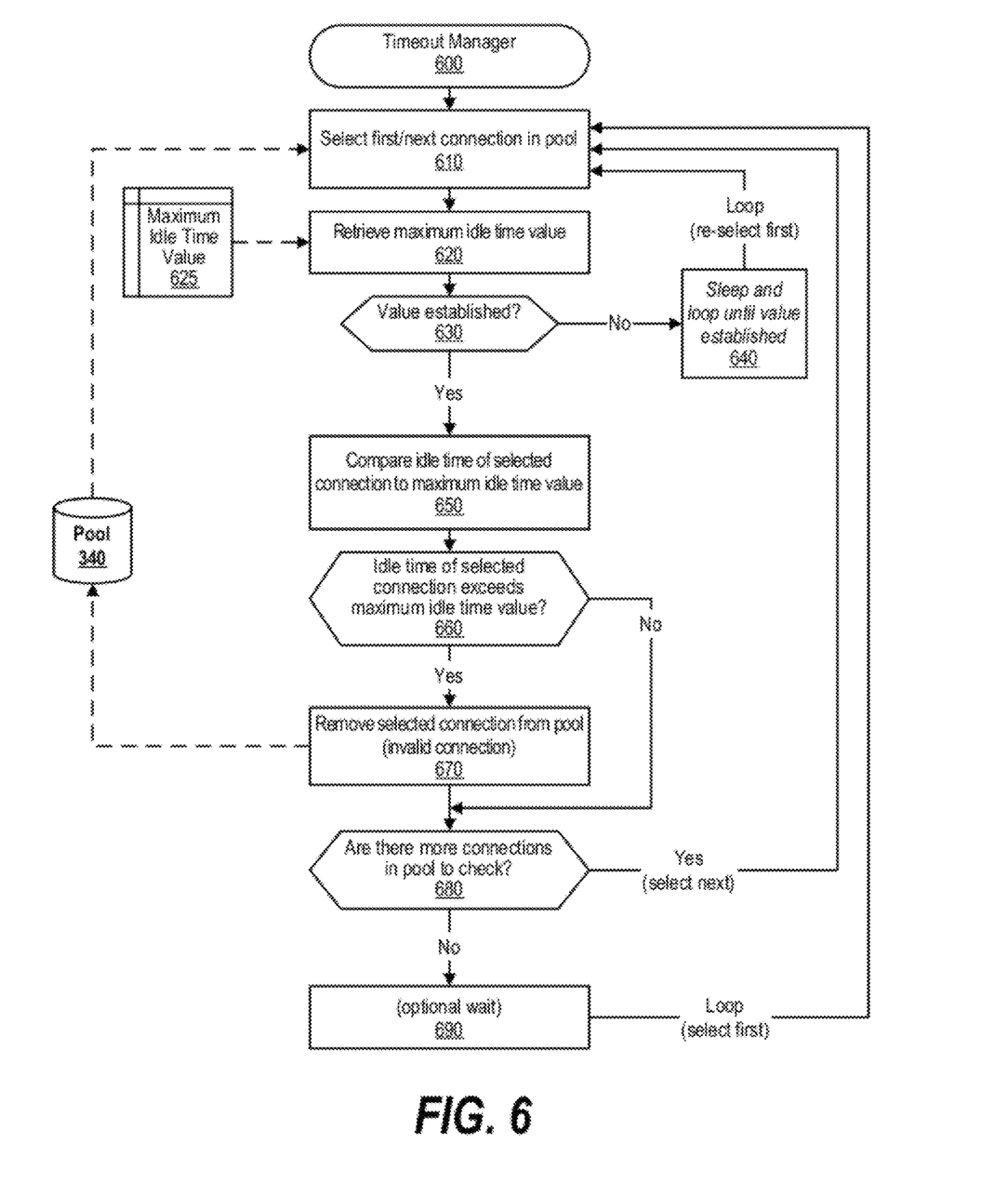
FIG. 6 is a flowchart showing steps taken by the timeout manager to test pooled connections against timeout values.
Figure 7:
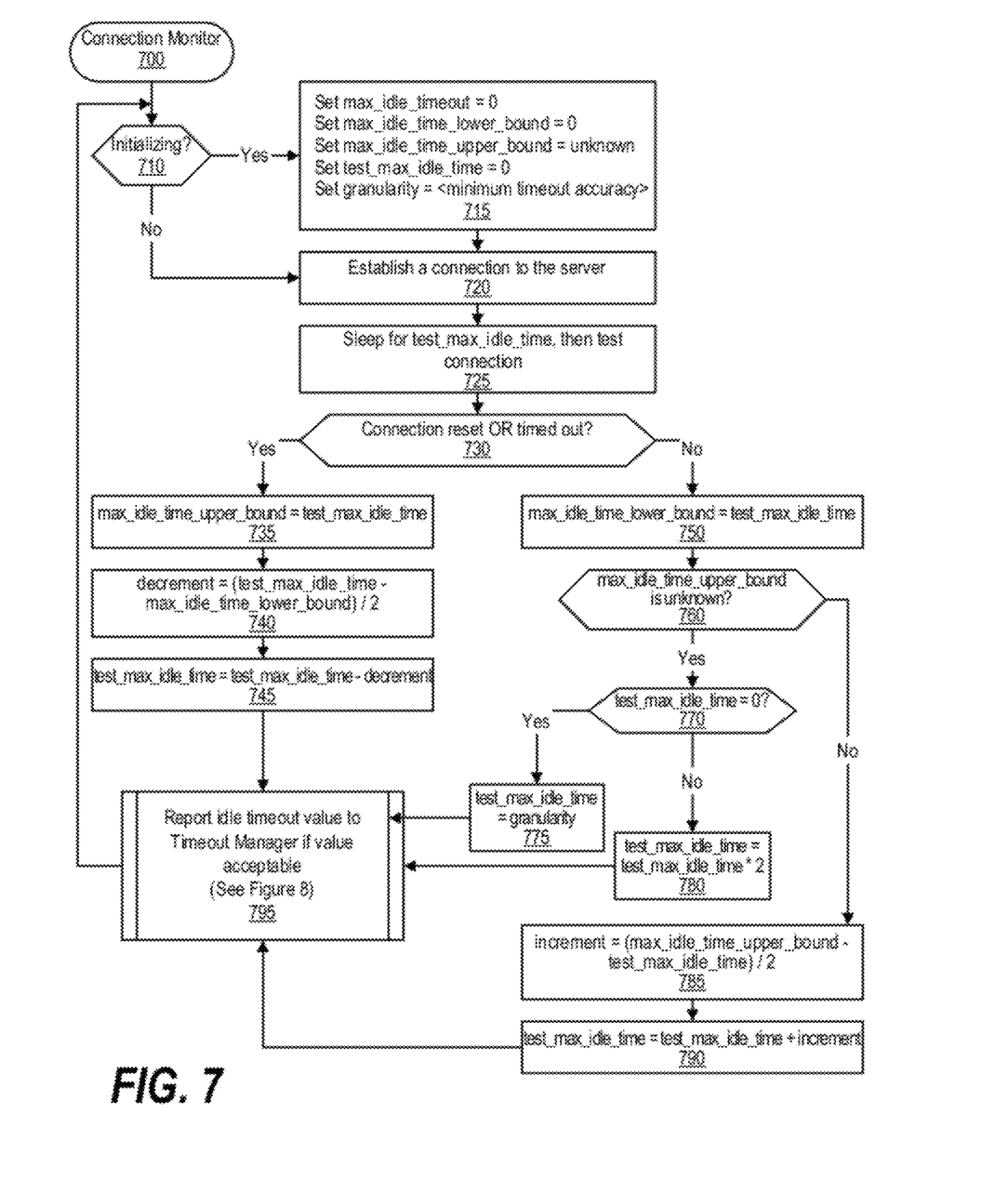
FIG. 7 is a flowchart showing steps taken by the connection monitor to monitor connection timeout values with a server.
Figure 8:
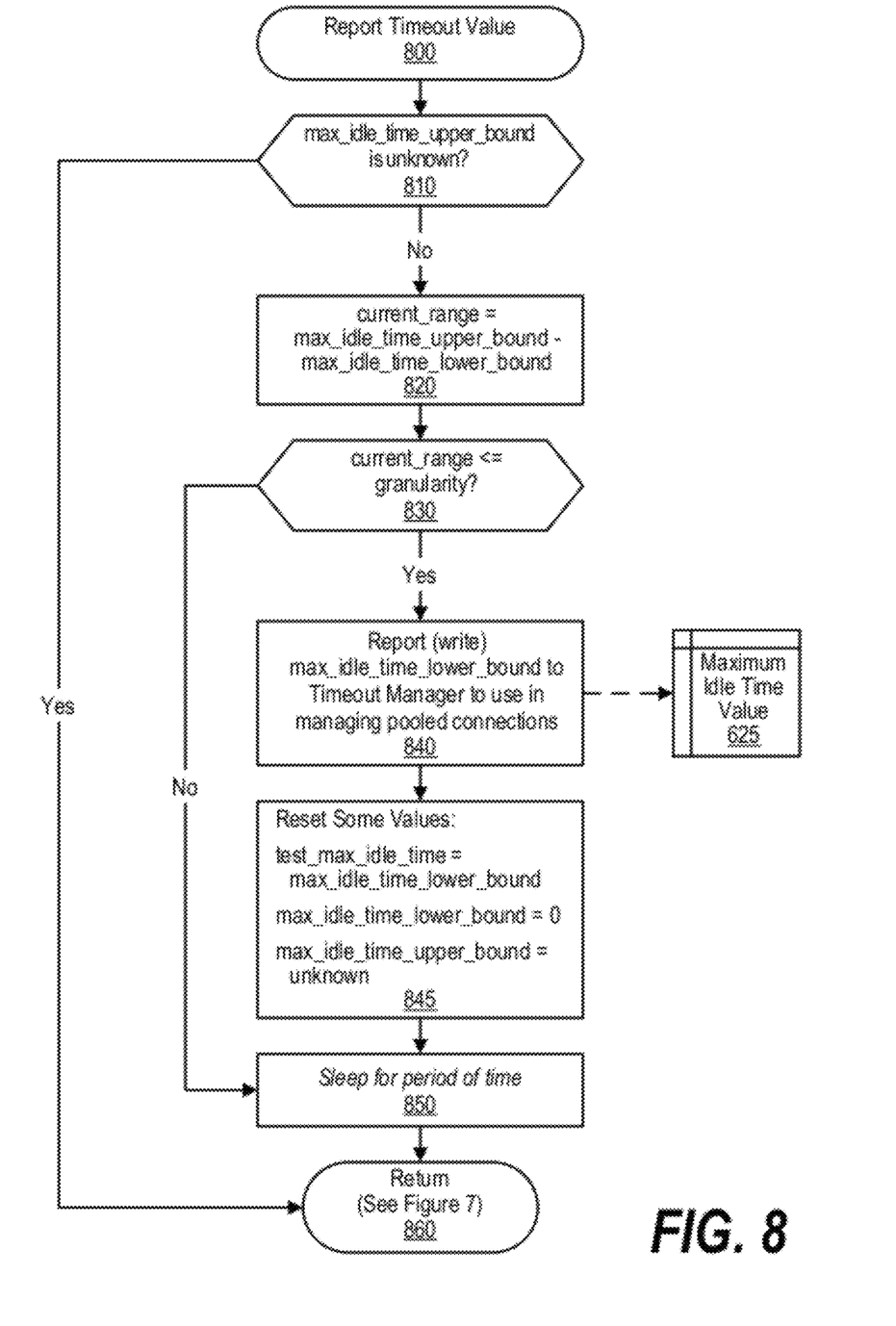
FIG. 8 is a flowchart showing steps taken by the connection monitor to report the idle timeout value to the timeout manager.

FIG. 6 is a flowchart showing steps taken by the timeout manager to test pooled connections against timeout values. Timeout manager processing commences at 600 whereupon, at step 610, the transaction manager selects the first connection from connection pool 340. At step 620, the transaction manager retrieves the maximum idle time value from memory 625. As shown in FIGS. 7 and 8 and accompanying text, the maximum idle time value is periodically updated by the connection monitor.

A decision is made as to whether the maximum idle time value has yet been established corresponding to connections with the server (decision 630). If a value has not yet been established, then decision 630 branches to the "no" branch whereupon, at step 640, processing sleeps until a maximum idle time value is established. Processing then loops back to reselect the first connection from connection pool 340.

Once a maximum idle time value has been established, decision 630 branches to the "yes" branch whereupon, at step 650, the timeout manager compares the idle time of the selected connection from the connection pool to the maximum idle time value. A decision is made as to whether the idle time of the selected connection exceeds the maximum idle time value based on the comparison (decision 660). If the idle time of the selection connection exceeds the maximum idle time value, then decision 660 branches to the "yes" branch whereupon, at step 670, the selected connection is removed from connection pool 340 as being an invalid connection. On the other hand, if the idle time of the selected connection does not exceed the maximum idle time value, then decision 660 branches to the "no" branch bypassing step 670.

A decision is made as to whether there are more connections in connection pool 340 to process (decision 680). If there are more connections in connection pool 340 to process, then decision 680 branches to the "yes" branch which loops back to select the next connection in the connection pool and processes it as described above. This looping continues until all of the connections have been processed, at which point decision 680 branches to the "no" branch. After an optional wait step (step 690), timeout processing loops back to select the first connection in the connection pool and starts re-processing all of the connections as described above. The actual connections that are checked can be different between iterations because some connections may be added to the connection pool (as shown in FIG. 5), deleted by the timeout manager in step 670, and removed from the connection pool for use by the transaction manager (as shown in FIG. 4).

FIG. 7 is a flowchart showing steps taken by the connection monitor to monitor connection timeout values with a server. Connection monitor processing commences at 700 whereupon a decision is made as to whether the connection monitor is being initialized (decision 710) for a particular server. If the connection monitor is being initialized, then decision 710 branches to the "yes" branch whereupon, at step 715, some variables used by the connection monitor are initialized. These variables include the maximum idle time value (max_idle_timeout) which is initialized to zero. The maximum idle time lower boundary value (max_idle_time_lower_bound) is also initialized to zero. The maximum idle time upper time value (max_idle_time_upper_bound) is initialized to "unknown." The test maximum idle time value is also initialized to zero. Finally, the granularity value is set to the minimum timeout accuracy value desired for the environment (e.g., set by a system administrator, etc.). On the other hand, if the connection monitor is not being initialized, then decision 710 branches to the "no" branch bypassing step 715.

At step 720, the connection monitor establishes a new connection with the server computer system. At step 725, the connection monitor sleeps for the amount of time currently established for the test maximum idle time value (test_max_idle_time). Also at step 725, the connection is tested to ascertain if the connection is still valid after the amount of time (test_max_idle_time) has elapsed. A decision is made as to whether the connection has been reset or timed out (decision 730). If the connection was reset or timed out, indicating that the connection is invalid, then decision 730 branches to the "yes" branch where steps 735, 740, and 745 are performed.

At step 735, the maximum idle time upper boundary value (max_idle_time_upper_bound) is set to be equal to the current test maximum idle time value. At step 740, a decrement value is calculated by subtracting the maximum idle time lower boundary value from the test maximum idle time value and then dividing this result by two. At step 745, the test maximum idle time value is adjusted by subtracting the decrement value from the current test maximum idle time value. Predefined process 795 is then called to report the maximum idle time value to the timeout manager if the maximum idle time value falls within an acceptable range (see FIG. 8 and corresponding text for processing details).

Returning to decision 730, if neither the connection was reset nor the connection timed out (indicating that the connection is still valid), then decision 730 branches to the "no" branch where steps 750 to 790 are performed. At step 750, the maximum idle time lower boundary value is set to be equal to the test maximum idle time value. A decision is made as to whether the maximum idle time upper boundary value (max_idle_time_upper_bound) is still an unknown value as originally initialized (decision 760). If the maximum idle time upper boundary value is still an unknown value, then decision 760 branches to the "yes" branch whereupon a decision is made as to whether the test maximum idle time value (test_max_idle_time) is still set to zero as it was originally initialized (decision 770). If the test maximum idle time value is set to zero, then decision 770 branches to the "yes" branch whereupon, at step 775, the test maximum idle time value is set to the granularity value before predefined process 795 is called to report the maximum idle time value to the timeout manager if the maximum idle time value falls within an acceptable range (see FIG. 8 and corresponding text for processing details). On the other hand, if the test maximum idle time value is not equal to zero, then decision 770 branches to the "no" branch whereupon, at step 780, the test maximum idle time value is adjusted by doubling the test maximum idle time value before predefined process 795 is called to report the maximum idle time value to the timeout manager if the maximum idle time value falls within an acceptable range (see FIG. 8 and corresponding text for processing details).

Returning to decision 760, if the maximum idle time upper boundary value is not an unknown value, then decision 760 branches to the "no" branch whereupon, at step 785, an increment value is calculated by subtracting the test maximum idle time value from the maximum idle time upper boundary value (max_idle_time_upper_bound—test_max_idle_time) and then this result is divided by two. At step 790, the test maximum idle time value is adjusted by increasing the test maximum idle time value by the increase value. Predefined process 795 is then called to report the maximum idle time value to the timeout manager if the maximum idle time value falls within an acceptable range (see FIG. 8 and corresponding text for processing details).

After predefined process 795 is performed, processing continually loops back from predefined process 795 to the beginning using the variables as altered in the steps from the previous executions of FIG. 7 and FIG. 8. In this manner, the maximum idle time value is refined to both increase the accuracy of the maximum idle time value as well as to identify any changes made to the server regarding the timeout value.

FIG. 8 is a flowchart showing steps taken by the connection monitor to report the idle timeout value to the timeout manager. Processing commences at 800 whereupon a decision is made as to whether the maximum idle time upper boundary value (max_idle_time_upper_bound) is an unknown value (decision 810). If the maximum idle time upper boundary value is an unknown value, then decision 810 branches to the "yes" branch bypassing the remaining steps and processing returns to the calling routine at 860. On the other hand, if the maximum idle time upper boundary value is a known value, then decision 810 branches to the "no" branch for further processing shown in steps 820 through 850.

At step 820, a current range value (current_range) is calculated by subtracting the maximum idle time lower boundary value (max_idle_time_lower_bound) from the maximum idle time upper boundary value (max_idle_time_upper_bound). A decision is made as to whether the current range value is less than or equal to the granularity value (decision 830). If the current range value is less than or equal to the granularity value, then decision 830 branches to the "yes" branch whereupon, at step 840, the process writes the maximum idle time value to memory 625 with the maximum idle time value being the current maximum idle time lower boundary value (max_idle_time_lower_bound). This maximum idle time value will be used by the timeout manager, as shown in FIG. 6, to remove connections from the connection pool that are no longer valid because their idle times exceed the maximum idle time value. At step 845, some of the values used in the processing shown in FIG. 7 are reset. The resetting includes resetting the test maximum idle time value (test_max_idle_time) to be equal to the maximum idle time lower boundary value (max_idle_time_lower_bound). In addition, the maximum idle time lower boundary value (max_idle_time_lower_bound) is reset to be equal to zero, and the maximum idle time upper boundary value (max_idle_time_upper_bound) is reset to be an unknown value.

Returning to decision 830, if the current range value is greater than the granularity value, then decision 830 branches to the "no" branch bypassing steps 840 and 845. At step 850, processing optionally sleeps for a period of time before returning to the calling routine (see FIG. 7) at 860.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system comprising:
   identifying a connection request to connect to an external network entity;
   selecting one or more connections from a connection pool that includes one or more currently unused connections with the external network entity;
   validating one of the selected connections by comparing an idle time associated with each of the selected connections to a maximum idle time value, the maximum idle time value corresponding to an amount of time allowed for open connections by the external network entity, wherein the maximum idle time value was previously identified at the information handling system; and
   using the validated connection to connect to the external network entity.

2. The method of claim 1 further comprising:
   creating a new connection to the external network entity in response to the validation step failing to validate any of the selected connections.

3. The method of claim 1 further comprising:
   identifying the maximum idle time value, wherein the identifying further comprises:
   establishing a plurality of new connections with the external network entity;
   sleeping for a plurality of different time values, wherein each of the plurality of different time values corresponds to one of the plurality of new connections;
   identifying, after the plurality of different time values has expired, whether the new connection corresponding to each of the different time values is still valid;
   selecting, based on the identification of at least one still valid new connection, the maximum idle time value.

4. The method of claim 3 wherein identifying the maximum idle time value further comprises:
   selecting the plurality of different time values in ascending order from a smallest value to a largest value; and
   reporting a new maximum idle time value based on the selected different time value in response to the corresponding new connection being still valid after the selected different time value has elapsed.

5. The method of claim 4 further comprising:
   ensuring that a maximum idle time upper boundary is a known value before reporting the new maximum idle time value.

6. The method of claim 3 wherein identifying the maximum idle time value further comprises:
   selecting the plurality of different time values in ascending order from a smallest value to a largest value;
   calculating a test maximum idle time value by decreasing the first of the plurality of different time values corresponding to one of the new connections that is invalid;
   creating a second of the new connections;
   associating the second of the new connections with the calculated test minimum idle time value; and
   testing the second of the new connections after the calculated test minimum idle time value has elapsed.

7. An information handling system comprising:
   one or more processors;
   a memory that is accessible by at least one of the processors;
   a connection pool stored in the memory, wherein the connection pool includes one or more currently unused connections with an external network entity;
   a network adapter that connects the information handling system to a computer network; and
   a set of instructions executed by at least one of the one or more processors in order to perform actions of:
   identifying a connection request to connect to the external network entity through the network adapter;
   selecting one or more of the connections from the connection pool;
   validating one of the selected connections by comparing an idle time associated with each of the selected connections to a maximum idle time value, the maximum idle time value corresponding to an amount of time allowed for open connections by the external network entity, wherein the maximum idle time value was previously identified at the information handling system; and using the validated connection to connect to the external network entity.

8. The information handling system of claim 7 wherein the actions further comprise:
creating a new connection to the external network entity in response to the validation step failing to validate any of the selected connections.

9. The information handling system of claim 7 wherein the actions further comprise:
identifying the maximum idle time value, wherein the identifying further comprises:
establishing a plurality of new connections with the external network entity;
sleeping for a plurality of different time values, wherein each of the plurality of different time values corresponds to one of the plurality of new connections;
identifying, after the plurality of different time values has expired, whether the new connection corresponding to each of the different time values is still valid;
selecting, based on the identification of at least one still valid new connection, the maximum idle time value.

10. The information handling system of claim 9 wherein the identifying of the maximum idle time value further includes additional actions comprising:
selecting the plurality of different time values in ascending order from a smallest value to a largest value; and
reporting a new maximum idle time value based on the selected different time value in response to the corresponding new connection being still valid after the selected different time value has elapsed.

11. The information handling system of claim 10 wherein the actions further comprise:
ensuring that a maximum idle time upper boundary is a known value before reporting the new maximum idle time value.

12. The information handling system of claim 9 wherein the identifying of the maximum idle time value further includes additional actions comprising:
selecting the plurality of different time values in ascending order from a smallest value to a largest value;
calculating a test maximum idle time value by decreasing the first of the plurality of different time values corresponding to one of the new connections that is invalid;
creating a second of the new connections;
associating the second of the new connections with the calculated test minimum idle time value; and
testing the second of the new connections after the calculated test minimum idle time value has elapsed.

13. A computer program product stored in a non-transitory computer readable storage medium, comprising computer program code that, when executed by an information handling system, causes the information handling system to perform actions that include:
identifying a connection request to connect to an external network entity;
selecting one or more connections from a connection pool that includes one or more currently unused connections with the external network entity;
validating one of the selected connections by comparing an idle time associated with each of the selected connections to a maximum idle time value, the maximum idle time value corresponding to an amount of time allowed for open connections by the external network entity, wherein the maximum idle time value was previously identified at the information handling system; and
using the validated connection to connect to the external network entity.

14. The computer program product of claim 13 wherein the computer program code, when executed, causes the information handling system to perform additional actions comprising:
creating a new connection to the external network entity in response to the validation step failing to validate any of the selected connections.

15. The computer program product of claim 13 wherein the computer program code, when executed, causes the information handling system to perform additional actions comprising:
identifying the maximum idle time value, wherein the identifying further comprises:
establishing a plurality of new connections with the external network entity;
sleeping for a plurality of different time values, wherein each of the plurality of different time values corresponds to one of the plurality of new connections;
identifying, after the plurality of different time values has expired, whether the new connection corresponding to each of the different time values is still valid;
selecting, based on the identification of at least one still valid new connection, the maximum idle time value.

16. The computer program product of claim 15 wherein identifying the maximum idle time value includes additional actions comprising:
selecting the plurality of different time values in ascending order from a smallest value to a largest value; and
reporting a new maximum idle time value based on the selected different time value in response to the corresponding new connection being still valid after the selected different time value has elapsed.

17. The computer program product of claim 16 wherein the computer program code, when executed, causes the information handling system to perform additional actions comprising:
ensuring that a maximum idle time upper boundary is a known value before reporting the new maximum idle time value.

18. The computer program product of claim 15 wherein identifying the maximum idle time value includes additional actions comprising:
selecting the plurality of different time values in ascending order from a smallest value to a largest value;
calculating a test maximum idle time value by decreasing the first of the plurality of different time values corresponding to one of the new connections that is invalid;
creating a second of the new connections;
associating the second of the new connections with the calculated test minimum idle time value; and
testing the second of the new connections after the calculated test minimum idle time value has elapsed.

19. A method implemented by an information handling system comprising:
identifying a maximum idle time value corresponding to an external network entity value, wherein the maximum idle time value corresponds to an amount of time allowed for open connections by the external network entity;
comparing the maximum idle time value to one or more connection idle times associated with one or more connections included in a connection pool;

selecting one or more of the connections from the connection pool in response to the comparison revealing that the connection idle times associated with the selected connections is greater than the identified maximum idle time, wherein the selected connections are removed from the connection pool, and wherein the identification of the maximum idle time value further comprises:
  initializing a test maximum idle time value;
  repeatedly testing the test maximum time value by:
    establishing a new connection to the external network entity;
    discontinuing use of the new connection until the test maximum idle time value has elapsed;
    testing the established new connection after the test maximum idle time value has elapsed;
    decreasing the test maximum idle time value in response to the testing revealing that the first new connection is invalid;
    increasing the test maximum idle time value in response to the testing revealing that the first new connection is valid; and
    calculating the maximum idle time value based on the test maximum idle time value.

20. The method of claim 19 wherein the increasing further comprises:
  setting a maximum idle time lower boundary value to the test maximum idle time value; and
  in response to a maximum idle time upper boundary value being unknown:
  setting the test maximum idle time value to a granularity value in response to a previous test maximum idle time being an initialized value; and
  doubling the test maximum idle time value in response to the previous test maximum idle time being greater than zero.

21. The method of claim 20 wherein the increasing further comprises:
  in response to a maximum idle time upper boundary value being a known value:
  calculating an increment value by halving a difference between the maximum idle time upper boundary and the test maximum idle time; and
  increasing the test maximum idle time by the increment value.

22. The method of claim 21 wherein the decreasing further comprises:
  setting a maximum idle time upper boundary value to the test maximum idle time value
  calculating a decrement value by halving a difference between the test maximum idle time and the maximum idle time lower boundary; and
  decreasing the test maximum idle time by the decrement value.

23. The method of claim 22 wherein the calculating further comprises:
  calculating a current range value by subtracting the maximum idle time lower boundary value from the maximum idle time upper boundary value;
  comparing the current range value to a granularity value; and
  setting the maximum idle time value to the maximum idle time lower boundary value in response to the current range value being less than the granularity value.

24. The method of claim 23 wherein the maximum idle time value is not set while the maximum idle time upper boundary value is unknown.

* * * * *